US012343293B2

(12) United States Patent
Ethen et al.

(10) Patent No.: US 12,343,293 B2
(45) Date of Patent: Jul. 1, 2025

(54) PEDAL ASSEMBLY FOR A PATIENT SUPPORT APPARATUS

(71) Applicant: Stryker Corporation, Kalamazoo, MI (US)

(72) Inventors: Tyler Joseph Ethen, Portage, MI (US); Anish Paul, Portage, MI (US); Joseph Adam Upchurch, Kalamazoo, MI (US); William Dwight Childs, Plainwell, MI (US)

(73) Assignee: Stryker Corporation, Portage, MI (US)

( * ) Notice: Subject to any disclaimer, the term of this patent is extended or adjusted under 35 U.S.C. 154(b) by 829 days.

(21) Appl. No.: 17/530,935

(22) Filed: Nov. 19, 2021

(65) Prior Publication Data

US 2022/0071824 A1 Mar. 10, 2022

Related U.S. Application Data

(63) Continuation of application No. 16/415,219, filed on May 17, 2019, now Pat. No. 11,229,565.

(Continued)

(51) Int. Cl.
*A61G 7/05* (2006.01)
*A61G 7/012* (2006.01)

(Continued)

(52) U.S. Cl.
CPC ............ *A61G 7/0528* (2016.11); *A61G 7/012* (2013.01); *A61G 7/015* (2013.01); *A61G 7/018* (2013.01); *A61G 7/08* (2013.01); *A61G 2203/46* (2013.01)

(58) Field of Classification Search
CPC ........ A61G 7/012; A61G 7/015; A61G 7/018; A61G 7/0528; A61G 7/08; A61G 2203/42; A61G 2203/46

(Continued)

(56) References Cited

U.S. PATENT DOCUMENTS 4,657,230 A 4/1987 Weseloh
4,922,574 A * 5/1990 Heiligenthal ......... B60B 33/026 16/35 R (Continued)

FOREIGN PATENT DOCUMENTS

CN 108095950 A * 6/2018
EP 1156936 B1 * 5/2005 ........... A61G 1/0243

(Continued)

OTHER PUBLICATIONS

Machine Translation of CN-108095950-A.*

*Primary Examiner* — David R Hare
(74) *Attorney, Agent, or Firm* — Warner Norcross + Judd LLP

(57) ABSTRACT

A patient support apparatus includes a pedal assembly for selecting between a first state and a second state different from the first state, and comprising first and second pedals. The first and second pedals are configured to pivot together in a first rotational direction relative to a respective pivot axis to transition from the first state to the second state, and the first and second pedals are configured to pivot together in a second rotational direction opposite the first rotational direction to transition from the second state to the first state. At least a distal portion of the first pedal is configured to pivot independently from the second pedal in the first rotational direction when in the first state, and at least a distal portion of the second pedal is configured to pivot independently from the first pedal in the second rotational direction when in the second state.

20 Claims, 14 Drawing Sheets

Related U.S. Application Data

(60) Provisional application No. 62/674,138, filed on May 21, 2018.

(51) Int. Cl.
*A61G 7/015* (2006.01)
*A61G 7/018* (2006.01)
*A61G 7/08* (2006.01)

(58) Field of Classification Search
USPC .............................................................. 5/620
See application file for complete search history.

(56) References Cited

U.S. PATENT DOCUMENTS

| | | | | |
|---|---|---|---|---|
| 5,377,372 | A * | 1/1995 | Rudolf | B60B 33/021 16/35 R |
| 5,450,639 | A * | 9/1995 | Weismiller | A61G 7/00 16/35 R |
| 6,230,343 | B1 * | 5/2001 | Buiskool | A61G 7/012 5/610 |
| 6,240,579 | B1 | 6/2001 | Hanson et al. | |
| 6,264,006 | B1 | 7/2001 | Hanson et al. | |
| 6,314,597 | B2 | 11/2001 | Heimbrock et al. | |
| 6,321,878 | B1 | 11/2001 | Mobley et al. | |
| 6,460,205 | B1 * | 10/2002 | Lewandowski | B60B 33/0092 5/625 |
| 6,473,921 | B2 | 11/2002 | Brooke et al. | |
| 6,575,052 | B2 | 6/2003 | Toennesland et al. | |
| 6,725,956 | B1 | 4/2004 | Lemire | |
| 6,749,034 | B2 | 6/2004 | Vogel et al. | |
| 6,792,630 | B1 | 9/2004 | Palmatier et al. | |
| 6,951,034 | B2 * | 10/2005 | Shiery | B60B 33/0005 16/35 R |
| 7,062,805 | B2 | 6/2006 | Hopper et al. | |
| 7,559,098 | B2 * | 7/2009 | He | A61G 7/0528 5/81.1 R |
| 7,690,059 | B2 | 4/2010 | Lemire et al. | |
| 7,698,760 | B2 | 4/2010 | Reckelhoff et al. | |
| 8,016,301 | B2 | 9/2011 | Figel et al. | |
| 8,196,237 | B2 | 6/2012 | Herbst et al. | |
| 8,528,704 | B2 | 9/2013 | Hayes et al. | |
| 8,789,662 | B2 * | 7/2014 | Childs | A61G 7/05 16/35 R |
| 9,061,547 | B2 * | 6/2015 | Shih | B60B 33/021 |
| 9,351,890 | B2 | 5/2016 | Hough et al. | |
| 9,555,778 | B2 | 1/2017 | Lemire et al. | |
| 9,724,255 | B2 | 8/2017 | Hollyoak et al. | |
| 10,806,653 | B2 | 10/2020 | Upchurch et al. | |
| 10,905,609 | B2 | 2/2021 | Childs et al. | |
| 11,229,565 | B2 * | 1/2022 | Ethen | A61G 7/012 |
| 2007/0245488 | A1 | 10/2007 | Zimbalista et al. | |
| 2011/0083272 | A1 | 4/2011 | Childs et al. | |
| 2013/0111664 | A1 * | 5/2013 | Childs | B60B 33/026 280/80.1 |
| 2013/0318720 | A1 * | 12/2013 | Connell | A61G 7/0506 5/658 |
| 2015/0265480 | A1 * | 9/2015 | Boggs | A61G 7/0528 280/764.1 |
| 2017/0002752 | A1 | 1/2017 | Chi et al. | |
| 2017/0124844 | A1 | 5/2017 | Huster et al. | |

FOREIGN PATENT DOCUMENTS

| | | | | |
|---|---|---|---|---|
| WO | 2007075701 | A2 | 7/2007 | |
| WO | WO-2014013221 | A1 * | 1/2014 | A61G 7/05 |
| WO | WO-2015032003 | A1 * | 3/2015 | A47C 19/022 |

* cited by examiner

FIG. 6C
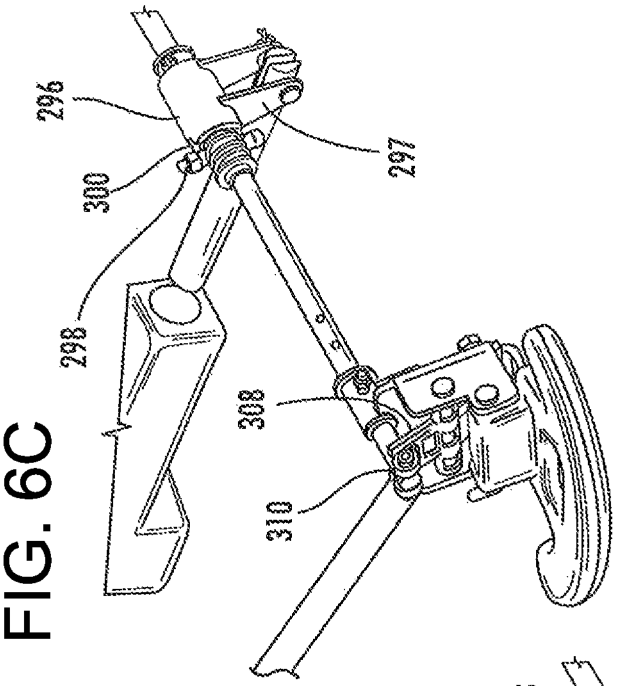
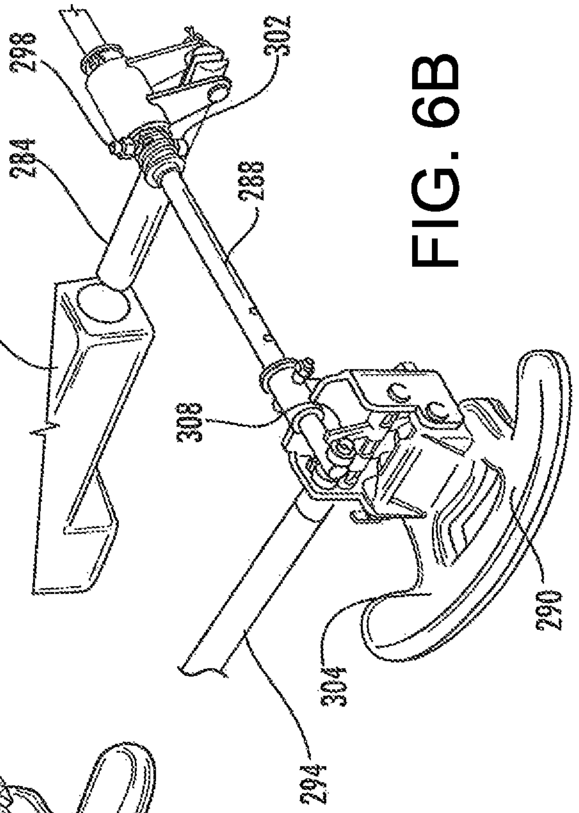
FIG. 6B
FIG. 6A
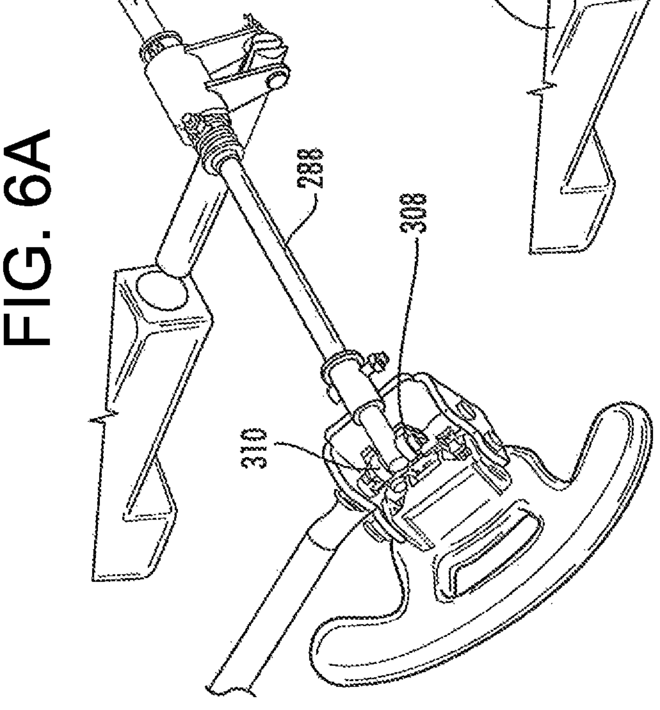

PEDAL ASSEMBLY FOR A PATIENT SUPPORT APPARATUS

CROSS-REFERENCE TO RELATED APPLICATIONS

This application claims priority to U.S. patent application Ser. No. 16/415,219, filed May 17, 2019, by inventors Tyler Joseph Ethen et al. and entitled PEDAL ASSEMBLY FOR A PATIENT SUPPORT APPARATUS, which claims the benefit of U.S. provisional patent application Ser. No. 62/674,138 filed May 21, 2018, by inventors Tyler Joseph Ethen et al. and entitled PEDAL ASSEMBLY FOR A PATIENT SUPPORT APPARATUS, the complete disclosure of which is incorporated herein by reference.

TECHNICAL FIELD

The present disclosure relates to patient support apparatuses. Specifically, the present disclosure relates to pedal assemblies for patient support apparatuses, (e.g. beds, stretchers, chairs, recliners, operating tables, cots, etc.).

BACKGROUND

Patient support apparatuses, such as hospital beds, may include pedal assemblies for manually selecting among two or more states. The pedal assemblies can be activated by an operator's hand or foot, depending on where the pedal assembly is located.

BRIEF DESCRIPTION OF THE DRAWINGS

FIG. 6A is a right perspective view of the braking system of FIG. 5A in an override mode wherein the central levering mechanism is in a steer position and wherein an override pedal is in a brake position;

FIG. 6B is a right perspective view of the braking system of FIG. 5A in a override mode wherein the central levering mechanism is in a steer position and wherein the override pedal is in a neutral position;

FIG. 6C is a right perspective view of the braking system of FIG. 5A in a override mode wherein the central levering mechanism is in a steer position and wherein the override pedal is in a steer position;

DETAILED DESCRIPTION

Some patient support apparatuses include pedal assemblies for selecting a mode of operation of some aspect of the apparatus. In some embodiments, pedal assemblies are used to select a mode of operation of the caster wheels of the apparatus, such as "brake," "steer," and "neutral." In such instances, the pedal assembly is configured to move to three different operating configurations and orientations with each configuration and orientation corresponding to a mode of operation. In some embodiments, the pedal assembly is disposed adjacent the floor to be easily activated by a caregiver's foot. Due to pedal assembly's proximity to the floor, an obstruction in the path of the pedal assembly may contact and cause the pedal assembly to move to another configuration, which causes the mode of operation to change regardless of the caregiver's intent. Furthermore, some apparatuses have multiple pedal assemblies that are located on different sides of the apparatus and are operably coupled to one another such that movement of one pedal assembly causes corresponding movement of the other pedal assembly(ies) to the same configuration and corresponding mode of operation. In such embodiments, the "obstruction" described above may be another person's foot, and the pedal assembly that moves due to movement of another pedal assembly (e.g., by being depressed by the caregiver) contacts the "obstruction" (i.e., the other person's foot).

Embodiments of the present disclosure are described herein. The disclosed embodiments are merely examples. Other embodiments may take various and alternative forms. The figures are not necessarily to scale. Some features in the figures could be exaggerated or minimized to show details of particular components. Therefore, specific structural and functional details disclosed herein are not to be interpreted as limiting, but merely as representation. Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
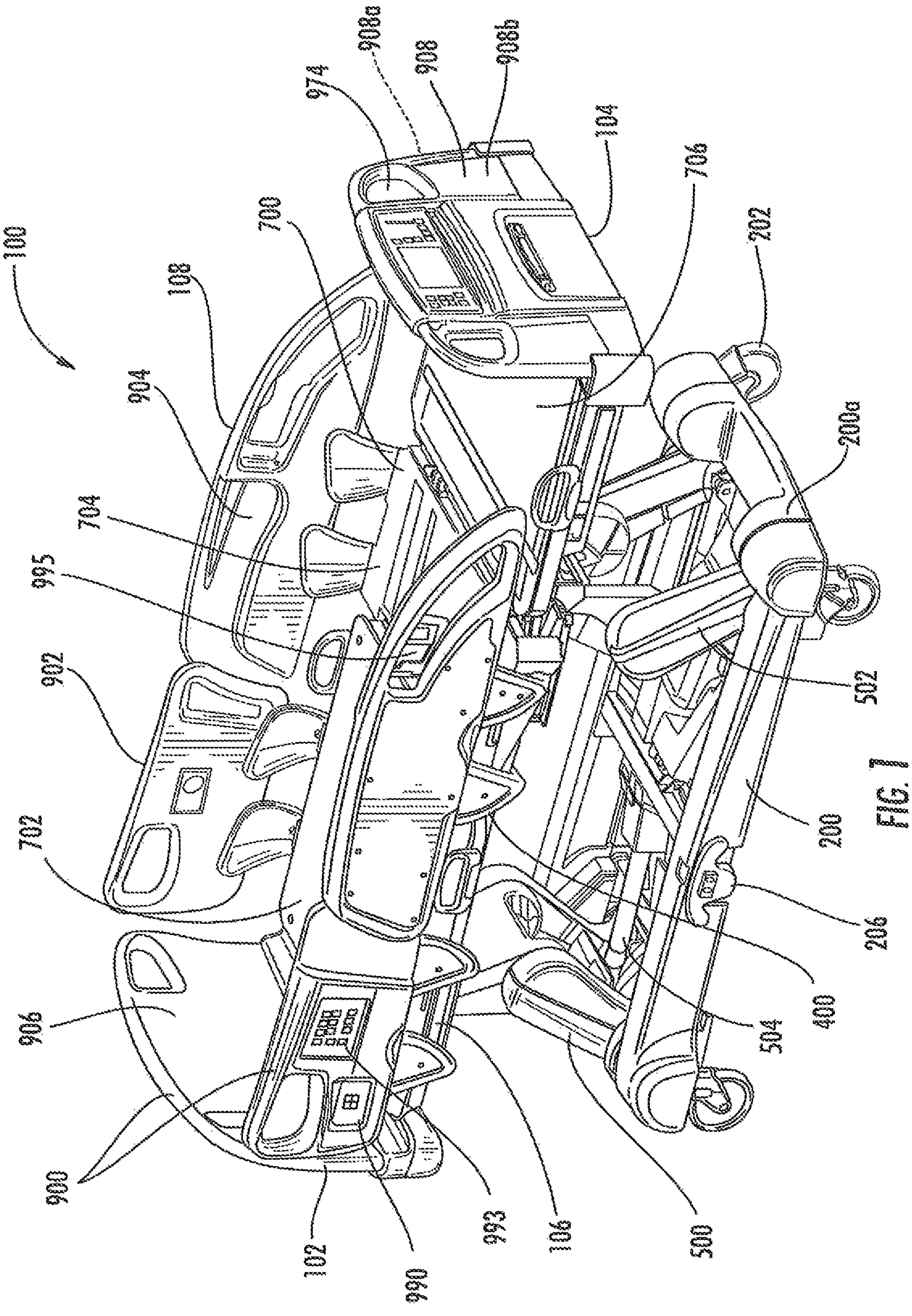
FIG. 1 is a perspective view of a patient support apparatus in accordance with an embodiment of the instant disclosure.

FIG. 1 is a perspective view of a patient support apparatus 100 in accordance with an embodiment of the instant disclosure. The apparatus defines a head end 102 and a foot end 104 at which a patient's head and feet can be positioned, respectively. The apparatus 100 further defines a right side 106 and left side 108.

In the illustrated embodiment, the apparatus 100 generally includes a frame system that forms a patient support and a base with a base frame 200. In another embodiment, other bases are used, including any structure that supports the patient support, such as a plurality of legs that extend downwardly from the patient support. As shown in FIG. 1, the frame system may include an intermediate frame 400 operably coupled to the base via an elevation system 500 configured to raise and lower the frame system relative to the base and thereby orient the intermediate frame 400 in various positions.

Still referring to FIG. 1, the base frame 200 may include a transport system with a set of bearing members 202, such as wheels, casters, or the like, allowing for motion and maneuverability of the apparatus 100. An optional drive wheel system, such as the system disclosed in U.S. Pat. No. 9,555,778, which is hereby incorporated by reference in its entirety as though fully set forth herein, may also be provided to facilitate movement of the apparatus 100 by an operator. A braking system 206, optionally including an emergency override system 208, may also be provided.

In the illustrated embodiment, the apparatus 100 also includes a head-end control module as well as various other control modules, panels, and/or consoles, is generally provided on the intermediate frame 400 and provides various controls, such as push handles for the above and other such systems.

In the illustrated embodiment, the frame system also includes a load-bearing frame 600 disposed atop the intermediate frame 400. A deck support 700 fitted to the load-bearing frame 600 may be provided upon which may be mounted a patient interface 800, such as a mattress or the like, for receiving a patient of the apparatus 100 thereon. In the illustrated embodiment, the deck support 700 generally includes a head or Fowler section 702 toward the head-end 102 of the apparatus 100, the head or Fowler section 702 being pivotally coupled to a seat/thigh or Knee Gatch section 704 that itself is pivotally coupled to a foot section 706 toward the foot-end 104 of the apparatus 100. Each of the head section 702, seat section 704, and foot section 706 may be configured to articulate the deck support 700 between a plurality of positions, such as a substantially horizontal position, a legs-down position, and a substantially seated position. In the illustrated embodiment, the patient interface 800 is configured to move with the deck support 700 thereby also including a head or Fowler section 802, a seat/thigh or Knee Gatch section 804, and a foot section 806 that may be oriented with the deck support's various sections. The patient interface 800 may be any one of a variety of mattresses, including for example, Gaymar, foam, or air mattress.

The apparatus 100 may further include a barrier system 900 with any combination of head-end side rails 902, foot-end side rails 904, a headboard 906, and a footboard 908. The various side rails 902, 904 may be adjustably coupled to the frame system and moveable relative thereto between their respective fully extended and fully retracted positions.

The apparatus 100 may also include a control system with one or more control interfaces (e.g., head-end panel, footboard console, side rail panels, remote panels, etc.) and/or devices (e.g., push handles for controlling power to the drive wheel mechanism, etc.) disposed on or near the apparatus, providing an operator and/or patient control access to the various features and/or commands, which may include various functions of patient support. In one embodiment, the control system, and other patient support functions requiring power, are powered by an AC plug connection to a remote power supply, such as a building outlet, or a battery supported by the frame system. The control system may be configured to operate and monitor a plurality of linear actuators provided to move, for example, the intermediate frame 400 relative to the base frame 200 (e.g., by controlling the elevation system 500), and to move the head, seat, and foot sections 702, 704 and 706 of the deck support 700.

Furthermore, a structural informatics system, which may comprise a diagnostic and control system component, may also be provided, wherein the apparatus 100 includes a plurality of electronic elements such as, for example, load sensors, tilt or angular sensors (e.g., inclinometers, etc.), linear sensors, temperature sensors, electronic controls and keyboards, wiring actuators for adjusting bed angles and the like, in addition to other electronic elements.

Also, a number of monitoring switches, such as brake status and/or override status switches 314 and 291 respectively, (e.g., see FIG. 3), a side rail position status switch, and other such switches may be provided and used independently, or again in combination with any number of the above or other such switches and/or sensors.

The diagnostic and control system can enable the specific control of each of these electronic elements for desired operation thereof and further can enable the monitoring of the operating conditions of these electronic elements and additional conditions of the apparatus 100. The diagnostic and control system further enables the evaluation and determination of the existence of one or more faults relating to the operation of the apparatus 100.

Figure 2:
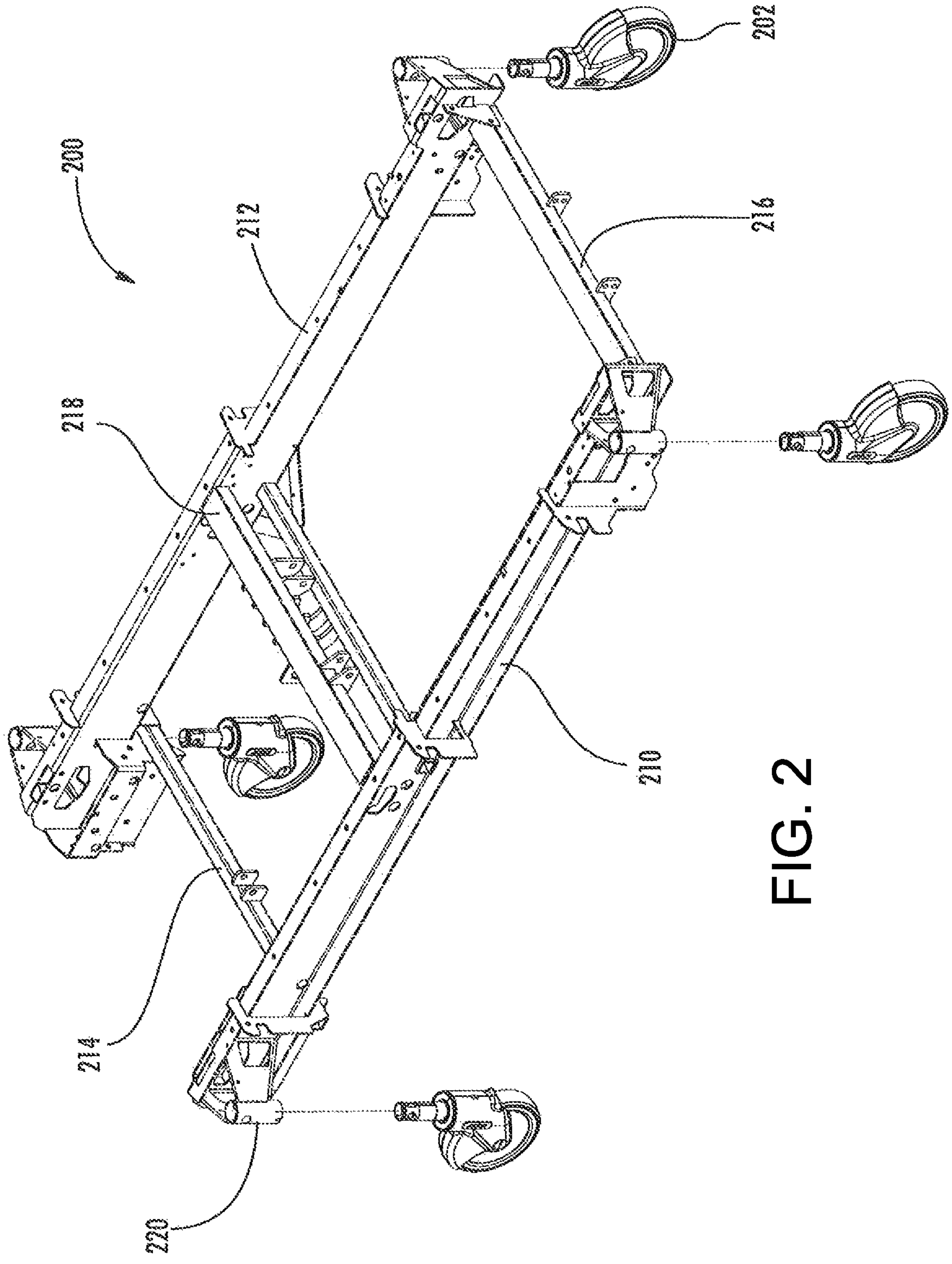
FIG. 2 is a perspective view of the base frame assembly of the patient support apparatus of FIG. 1, showing attachment of a wheel system thereto.

FIG. 2 is a perspective view of the base frame assembly of the patient support apparatus 100 of FIG. 1, showing attachment of a wheel system thereto. In the illustrated embodiment, the base frame 200 generally comprises a pair of side frame rails 210, 212 and two or more transversal frame rails, as in rails 214, 216 and 218 connected to, and extending between, the side frame rails 210 and 212. For example, in the embodiment illustrated in FIG. 2, the base frame 200 includes right and left side frame rails 210 and 212 respectively, a head-end rail 214, a foot-end rail 216, and an intermediate rail 218. These rails generally provide at least a portion of the foundation upon which the apparatus 100 is built.

A plurality of bearing members 202, such as wheels or caster devices, including casters or caster wheels, may be provided to enable mobility of the apparatus 100. In this particular embodiment, four casters 202 are provided and are pivotally mounted to the base frame 200 by respective mounting brackets 220 secured to the corners of the base frame 200. Further, each caster 202 may be operably coupled to a brake.

In one embodiment, the base frame 200 further comprises a sensor 203, such as an inclinometer or the like (e.g., see FIG. 3), for detecting and/or monitoring an inclination/orientation of the base frame 200. As will be described in greater detail below, data acquired using this and other such sensors disposed on various parts of the apparatus 100 can be used in calculating and monitoring various characteristics of the apparatus 100 and/or of a patient lying thereon. The sensor can be mounted elsewhere on the base frame 200 in other embodiments.

Figure 3:
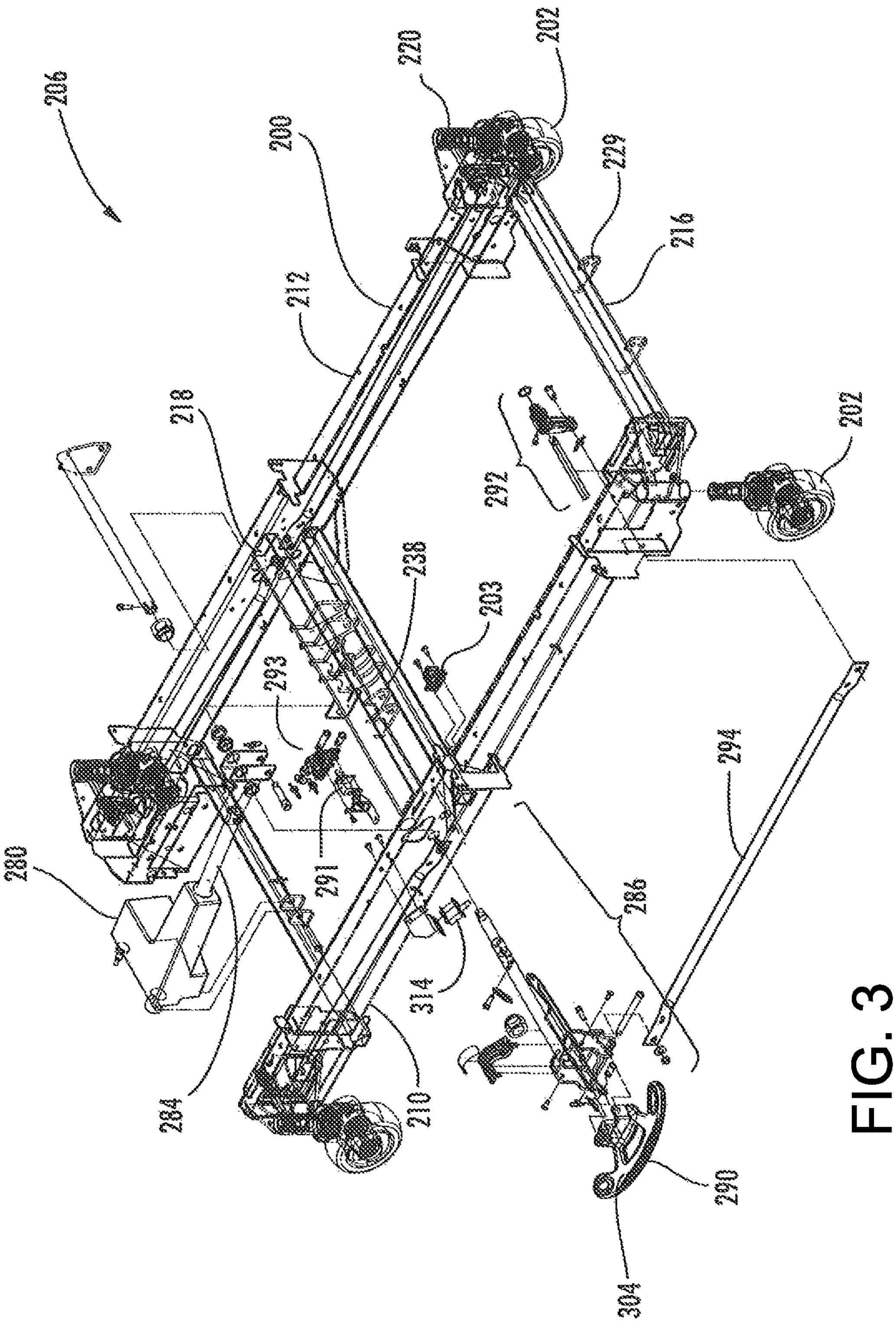
FIG. 3 is an exploded perspective view of the base frame assembly of FIG. 2, showing attachment of a braking system thereto.

FIG. 3 is an exploded perspective view of the base frame assembly of FIG. 2, showing attachment of a braking system 206 thereto. In the illustrated embodiment, the patient support apparatus 100 further comprises a braking system 206 to selectively immobilize the apparatus 100 from moving and/or to selectively immobilize an orientation of one or more of the casters 202. In general, each caster 202 can be associated with a braking mechanism operated with or without control means provided by the control system. Each caster 202 can be associated with a respective braking mechanism, or again grouped and associated with respective group braking mechanisms to be operated individually, or via a common activation system. In the illustrated embodiment, the braking system 206 generally provides simultaneous braking of each caster 202. However, other braking systems wherein only some of the casters 202 are immobilized may also be considered.

In the illustrated embodiment, the braking system 206 generally comprises a low-force braking system for reducing the force needed by a user to activate and deactivate the braking system 206. For instance, the apparatus 100 may comprise a power-assisted or -actuated breaking system 206 (e.g., as described below) to facilitate an operation of the apparatus 100 using various available steering and/or braking features of this mechanism. In addition, such systems may further comprise one or more hand- and/or foot-actuated manual override mechanisms (e.g., see FIGS. 6A-8C) in the event of a power failure, for example. Contemplated brake system control means may include, but are not limited to, power-assisted hand and/or foot brakes, such as handles or pedals, user-actuatable devices, such as a button, a touch screen, and/or a switch, on one or more control panels provided on or near the apparatus 100, and other such controls powered electrically, hydraulically, pneumatically and/or magnetically.

For example, in one embodiment, the user can activate the brakes on one or more control panels located, for example, on the exterior of the head-end or foot-end side rails 902, 904 and/or on the head-end structure, within the vicinity of the push handles (if provided). Access to the brake activation can also be available on other control panels, including for example, a footboard control console, a removable panel, and the like. The positioning of the brake controls on one or more control panels allows the user to more easily access and activate the braking system 206. For instance, in some embodiments, the positioning of the side rails and/or the positioning of the patient interface (e.g., when the apparatus 100 is in a lowered position) may impede access to a manual brake activation pedal or handle (e.g., brake pedal 290 of FIGS. 4A-4C)). Having controls disposed on one or more control panels, however, allows the braking system 206 to still be readily accessed and controlled.

Furthermore, automatic brake control via the control system can also provide a safety feature when the system is in a motion lockout, further discussed below. In a total lockout of motion, a lock mechanism can prohibit movement functions from being controlled on the control panel(s), located for example on the side rails, footboard, pendant, and headboard, etc. The brake can be engaged during the lockout and not disengaged during a total lockout.

In one embodiment, the user engages the braking system 206, which imparts a braking force directly on the casters 202. The brake can be a cam that pushes on the tire. Alternatively, the brake may impart the braking force on the axle or separate disk (or the wheel itself). The brake system 206 is usable on heavy apparatuses and is adaptable to employ different braking mechanisms (ring, wheel, or direct floor pressure).

Furthermore, the casters 202 may comprise brake casters that are selectively operated in free rotation and brake modes, or steer/brake casters that are selectively operated in free rotation mode, pivotally locked mode, and brake mode, wherein actuation of the braking system 206 can implement immobilization of one or more casters from rotating (e.g., prohibit displacement of the apparatus) and/or pivoting (redirecting a displacement of the apparatus).

For instance, in one embodiment where a drive wheel mechanism is provided, the apparatus 100 may be operated in three states: a braking state wherein the casters 202 are rotatably and pivotally immobilized, a neutral state wherein the casters 202 are free to move in either direction, and a steering state wherein the casters 202 are still free to move in either direction while a drive wheel mechanism is activated. In another embodiment where a drive wheel mechanism is not provided, the apparatus 100 may again be operated in three states: braking and neutral states as described above, and a steering state wherein the foot-end casters 202 (or head-end casters if the apparatus 100 is operated from the foot-end) are pivotally immobilized while the other end casters (e.g., the head-end casters 202) can move freely. Other combinations and permutations of the above braking and steering options may also be considered. Selection of the brake mechanism's state may be implemented using a manually operated handle and/or pedal or via electronic controls (e.g., provided via control panels or the like).

For example, in one embodiment, three push buttons corresponding to brake, steer, and neutral states are provided on one or more control panels to selectively operate the braking system 206. These buttons may be operably coupled to one or more actuators (such as actuator 280 of FIGS. 4A-8C) configured to activate or deactivate the braking system 206. A manual override system 208 may also be integrated into the braking system 206 and may include, for example, a manually actuated pedal, as in pedal 290 of FIGS. 4A-8C, or the like.

In the illustrated embodiment, the braking system 206 is generally configured to immobilize the casters 202 from rotating such that a displacement of the apparatus 100 is substantially immobilized, and/or from pivoting such that a direction of the caster 202 is stabilized to facilitate, for example, steering of the apparatus 100. In the latter case, pivotal braking may be limited, for example, to two of the four casters 202 such that an operator of the apparatus 100 may select an orientation of the apparatus displacement by pivoting two of the casters 202, while using the pivotally locked casters 202 to facilitate this directional displacement.

In the embodiment illustrated in FIG. 3, the braking system 206 is configured such that a motorized control of the system 206 is imparted via a single motor or actuator 280. In particular, the actuator 280, controlled or operated from one or more control means such as brake handles, user actuatable devices, such as push buttons and the like (discussed further below with reference to the control system), is used to mechanically activate a locking mechanism on each of the casters 202. For example, a nurse may activate the brakes from the push handles. In one embodiment, the nurse may activate the brakes without removing his/her hands from the push handles. Although the illustrated embodiment is described as including a single actuator 280, such as an electric, a pneumatic, a magnetic, or a hydraulic actuator, for all four casters 202, a similar braking system 206 could be designed to include one such actuator for each caster 202, or again, one actuator for two casters 202 (e.g., a first actuator to control the head-end casters 202 and a second actuator to control the foot-end casters 202). Other combinations of actuators for any number of casters may also be used.

Figure 4C:
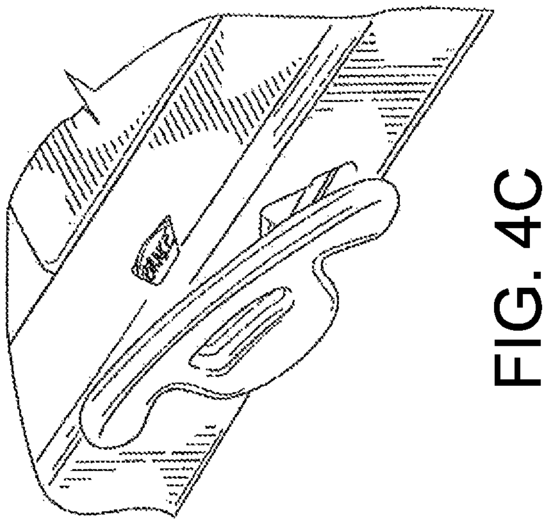
FIG. 4C is a right perspective view of an indicator system for the braking system of FIG. 3 shown in brake.
Figure 4B:
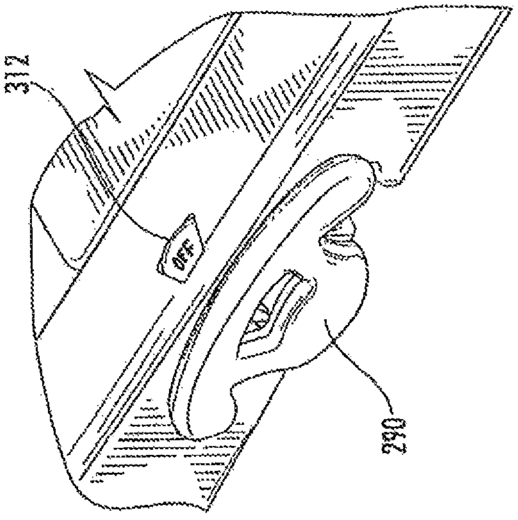
FIG. 4B is a right perspective view of an indicator system for the braking system of FIG. 3 shown in neutral.
Figure 4A:
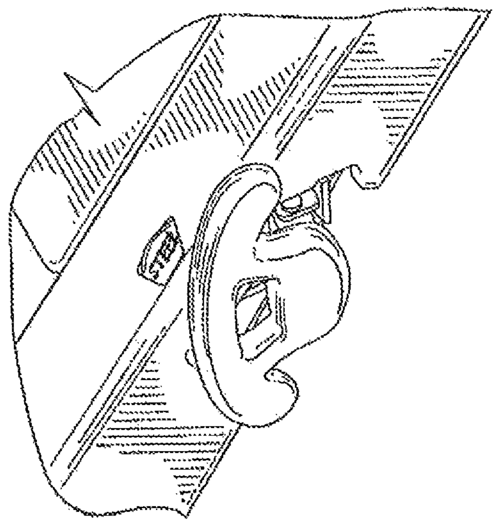
FIG. 4A is a right perspective view of an indicator system for the braking system of FIG. 3 shown in steer.

FIGS. 4A-4C are perspective views of the braking system of FIG. 3 in a steer, neutral, and brake position respectively. In the illustrated embodiment, the braking system 206 generally comprises a central levering mechanism 282 operably interconnecting a driven member 284 of actuator 280 to lateral levering mechanisms 286 on each side of the base frame 200 via a transversal shaft 288. In the illustrated embodiment, the lateral levering mechanisms 286, the right-hand side one of which is illustratively coupled to a manual override actuation pedal 290, are themselves configured to actuate the brake mechanism 292 (FIG. 3) on each caster 202 via longitudinally extending brake actuator bars 294. The longitudinally extending brake actuator bars 294 may be configured such that a substantially linear displacement thereof pivots respective brake actuating levers 295 that are configured to operate the respective brake mechanisms 292 of each caster 202. As shown in FIG. 3, the brake mechanisms 292 may include, for example, a locking cam or the like configured to selectively immobilize a given caster 202 from rotating and/or pivoting, depending on the type of caster used. It will be understood that other braking mechanisms may be considered herein without departing from the general scope and nature of the present disclosure. As noted, commercially available braking mechanisms are available from Tente. Furthermore, different braking mechanisms 292 may be used for different casters 202, depending on the intended purpose and use of such brake mechanisms.

Figure 5A:
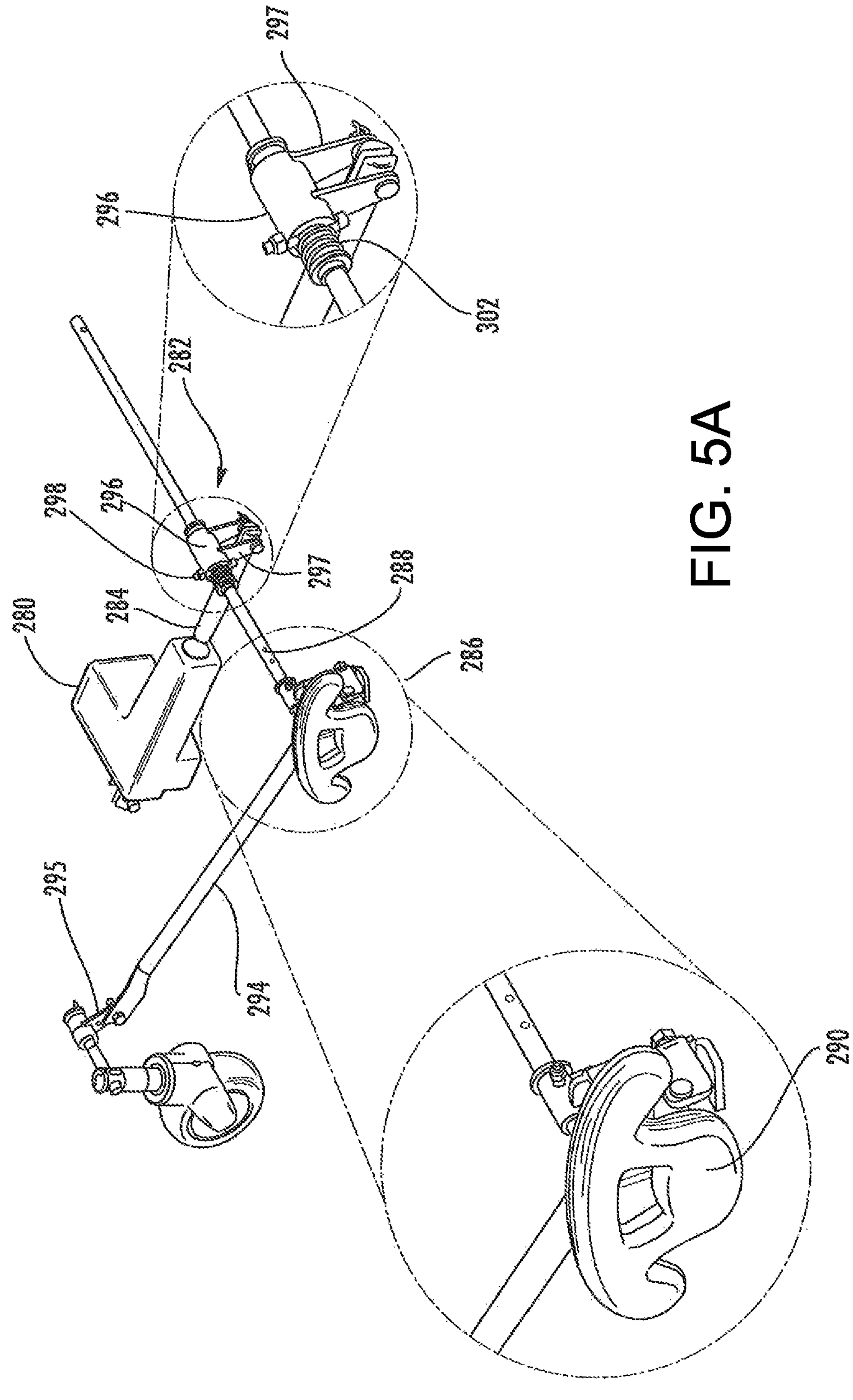
FIG. 5A is a right perspective view of an indicator system for the braking system of FIG. 3 shown in steer showing details A and B central and lateral levering mechanisms thereof, respectively.
Figure 5B:
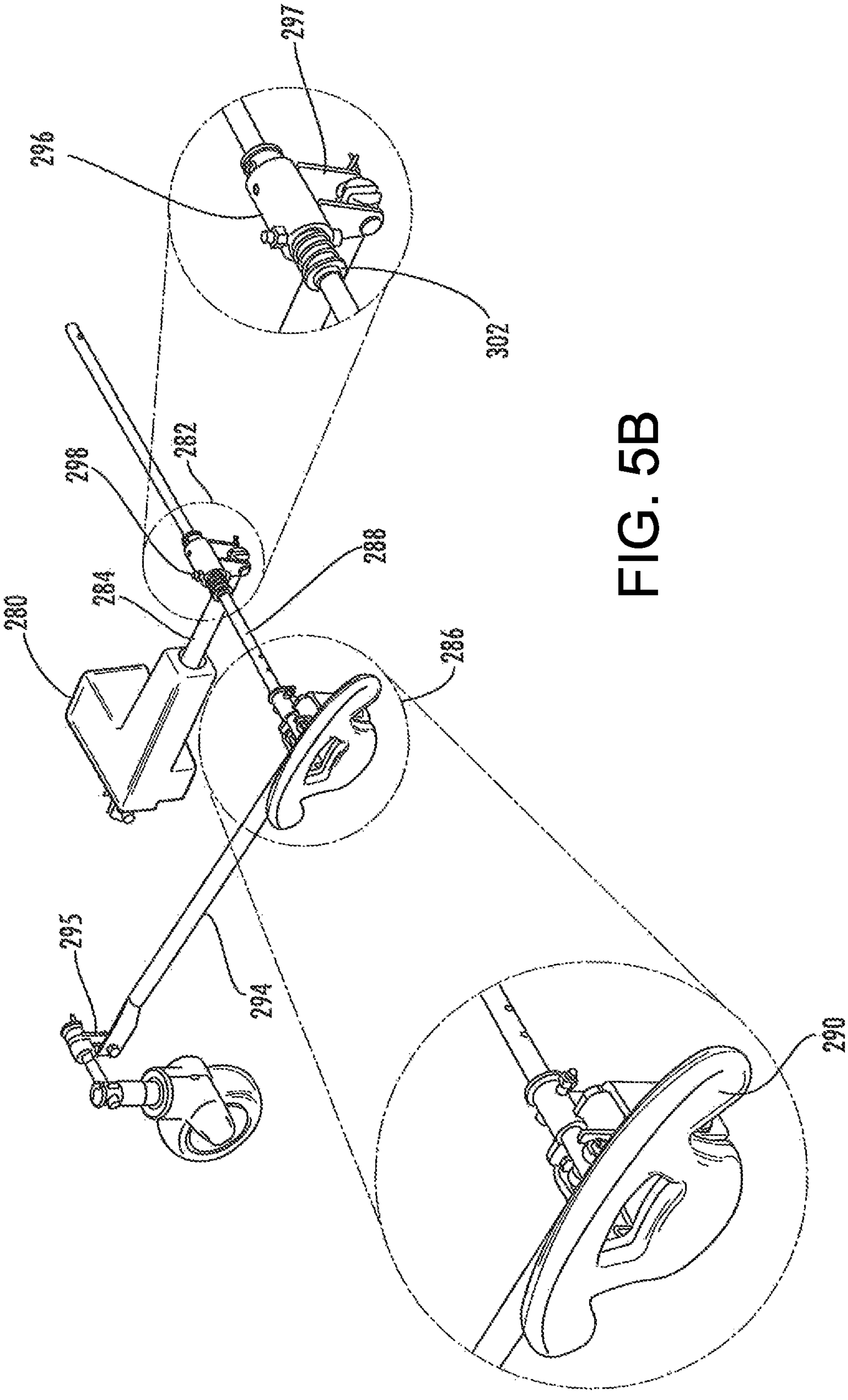
FIG. 5B is a right perspective view of an indicator system for the braking system of FIG. 3 shown in neutral showing details A and B central and lateral levering mechanisms thereof, respectively.
Figure 5C:
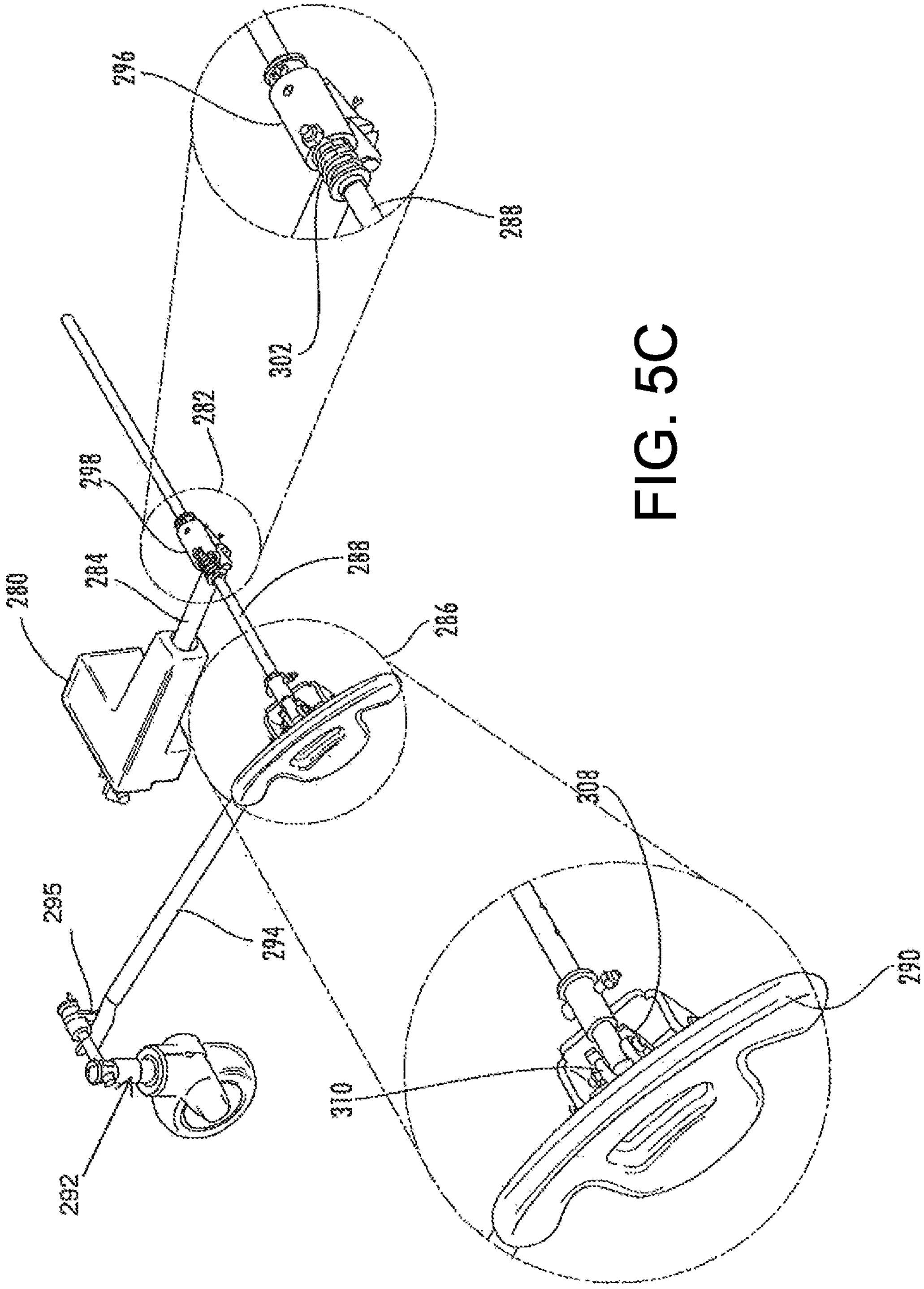
FIG. 5C is a right perspective view of an indicator system for the braking system of FIG. 3 shown in brake showing details A and B central and lateral levering mechanisms thereof, respectively.

With reference to FIGS. 5A-5C, in the illustrated embodiment, the central levering mechanism 282 comprises a sleeve member 296 that is slid toward the center of shaft 288 and coupled to the driven member 284 via flanges 297 extending radially outward therefrom. As best shown in FIG. 6A-8C, a bolt or pin 298 may further be provided through the shaft 288 and biased within a notch 300 formed in a periphery of the sleeve 296 by a spring mechanism 302, thereby operably coupling the sleeve 296 to the shaft 288 when the pin 298 is so biased, such that a rotation of the sleeve 296 under a pivoting action applied to the flanges 297 by the driven member 284, induces a rotation of the shaft 288. As will be described below, when the override pedal 290 is deployed, the shaft 288 may shift toward the right such that the pin 298 is released from the notch 300, thereby uncoupling the shaft 288 from the sleeve 296 and allowing for manual operation of the caster brake mechanisms 292.

In the illustrated embodiment, the shaft 288 extends across the base frame 200 and through to the lateral levering mechanisms 286 such that a rotation of the shaft 288 imparts a substantially linear displacement of the bars 294. As recited above, displacement of the bars 294 generally translates into operation of each caster's brake mechanism 292 via respective brake actuating levers 295. A protective cover may also be provided to hide and possibly protect the bars 294 and other elements of the braking system 206.

In the illustrated embodiment, an override pedal 290 is provided on the right-hand side of the apparatus 100 and is operably coupled to the lateral levering mechanism 286 on this side. In general, the override mechanism is practical in situations where the actuator 280 is in a given position and power thereto or to the control system 1000 is unavailable, thus preventing the actuator 280 from changing from one configuration to another. In one embodiment, the pedal 290 is spring-biased in an upright and stowed position (FIGS. 4A-5C) such that a downward pivoting force is required to extend the pedal 290 to an operable position in which an operating surface thereof 304 is substantially parallel with the floor (FIGS. 6A-8C). Furthermore, the pedal 290 may be configured such that when it is stowed, a clearance of about five inches is maintained below the pedal 290 irrespective of the pedal's orientation. Although this clearance may be obstructed when the pedal 290 is engaged, the clearance is regained automatically as the pedal 290 is returned to its stowed position.

With reference to FIGS. 6A-6C, when a force is applied to the pedal 290, a corresponding set of pivoting flanges 308 are configured to pivot and engage a bolt 310 transversally fastened through the end of the shaft 288 such that the shaft 288 is pulled toward the pedal side of the apparatus 100, thereby releasing the pin 298 from notch 300 and disengaging the actuator 280 from operative control of the braking system 206. As a result, control of the braking system 206 is then provided via the deployed pedal 290 rather than the motorized actuator 280 and controls thereof. When the foot or hand of the operator releases the pedal 290, the latter springs back to its upright position and the pin 298 is again urged toward the notch 300 by the spring mechanism 302.

In one embodiment, the release of pedal 290 is monitored by a switch 291 (FIG. 3) configured to report to the control system, whether the braking system 206 is currently in override mode. For example, as shown in FIG. 3, as the shaft 288 is pulled toward the pedal 290, a levering mechanism 293 may be configured to release a user actuatable device, such as a switch 291, indicating that the braking system 206 is in override mode. When the pedal 290 is released to its upright position, the switch 291 is pressed and reports this event to the control system, which may then activate the actuator 280 to pivot the central levering mechanism 282 through its course thereby rotating the sleeve member 296 to realign the notch 300 therein with pin 298 so to re-couple the actuator 280 with shaft 288. Alternatively, the pin 298 may be re-engaged with the notch 300 by manual rotation of the released pedal 290, or again by a control user actuatable device, such as a button or switch, provided therefor with the control system.

In one embodiment and with reference to FIGS. 4A-4C, a visual indicator 312 is also provided above the pedal 290 and configured to indicate a status of the braking system 206, and consequently the pedal 290 is moved through different positions (e.g. brake, neutral, steer), either manually or automatically via the control system. A sensor 314, such as a user actuatable device, such as a button or switch or the like, may also be provided to report a brake status to the control system, which may be conveyed to the operator via one or more visual user interfaces, as described further below. In general, the brake status indicator(s) may help to avoid having the user inadvertently leave the bed without the brakes being set.

FIGS. 4A-4C show a change of the visual indicator 312 and a motion of the pedal 290, when stowed, as the braking system 206 is selectively moved from steer, neutral and brake positions respectively.

FIGS. 5A-5C show an automatic actuation of the braking system 206 in steer, neutral and brake positions, respectively. For instance, in FIG. 5A, the actuator 280 fully extends the driven member 284 to pivot the handle 290 toward the head-end of the apparatus 100, thereby moving the bars 294 toward the foot-end of the apparatus 100, which in turn positions the caster braking mechanisms 292 in the steer state. In one embodiment, the steer state implies that all casters 202 are free to rotate and pivot, for example when a drive wheel mechanism is used. In another embodiment, the steer state implies that only head-end casters are free to rotate and pivot, while foot-end casters are pivotally immobilized. In the latter case, selecting the steer state may pivotally immobilize the foot-end casters in their current orientation until a push or pull force is applied to the apparatus, at which point these casters will orient themselves with an axis of the apparatus and lock to maintain this orientation as they rotate.

In FIG. 5B, the actuator 280 partially extends the driven member 284 to level the handle 290, thereby centering the bars 294, which in turn positions the caster brake mechanism 292 in the neutral state. In one embodiment, the neutral state implies that all casters 202 are free to rotate and pivot.

In FIG. 5C, the actuator 280 fully retracts the driven member 284 to pivot the handle 290 toward the foot-end of the apparatus 100, thereby moving the bars 294 toward the head-end of the apparatus 100, which in turn positions the caster braking mechanisms 292 in the brake state, which immobilizes the casters 202. During operation when the apparatus 100 is not moving, users typically engage the braking system 206. Users can visually verify the status of the brake state with the visual indicator 312, depicted in FIGS. 4A-4C.

FIGS. 6A-8C illustrate the manual override of the braking system 206, wherein the pedal 290 is deployed, generally by the foot of a user, though hand operation may also be contemplated. In general, as introduced above, when the pedal 290 is deployed, the pin 298 is released from notch 300 thereby uncoupling the actuator 280 and the shaft 288.

Figure 7C:
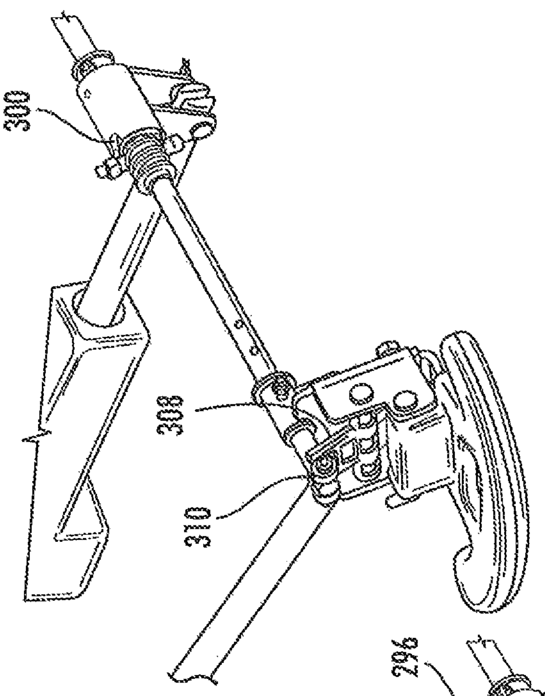
FIG. 7C is a right perspective view of the braking system of FIG. 5B in override mode wherein the central levering mechanism is in a neutral position and wherein the override pedal is in steer position respectively.
Figure 7B:
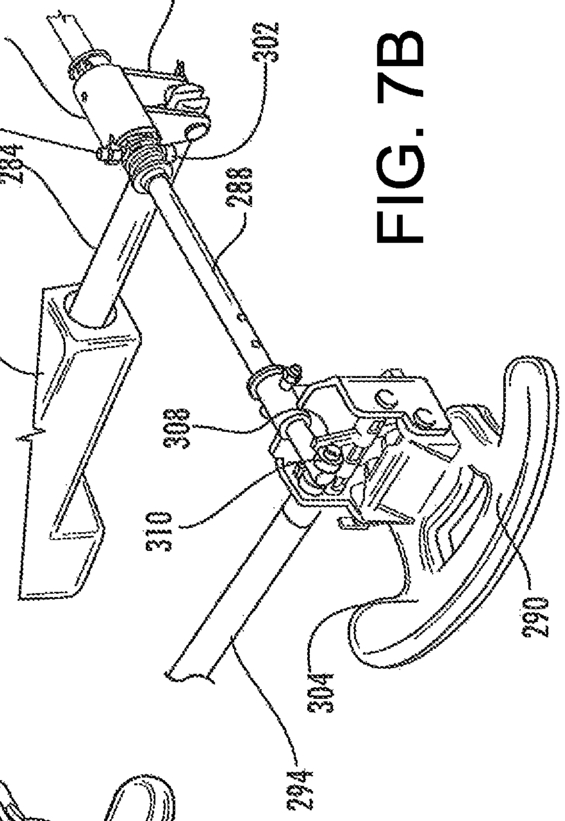
FIG. 7B is a right perspective view of the braking system of FIG. 5B in override mode wherein the central levering mechanism is in a neutral position and wherein the override pedal is in a neutral position.
Figure 7A:
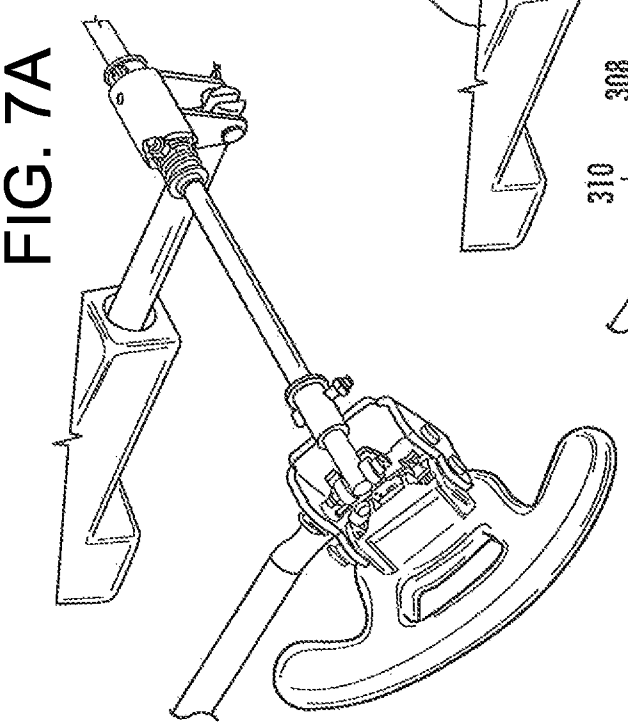
FIG. 7A is a right perspective view of the braking system of FIG. 5B in override mode wherein the central levering mechanism is in a neutral position and wherein the override pedal is in a brake position.
Figure 8C:
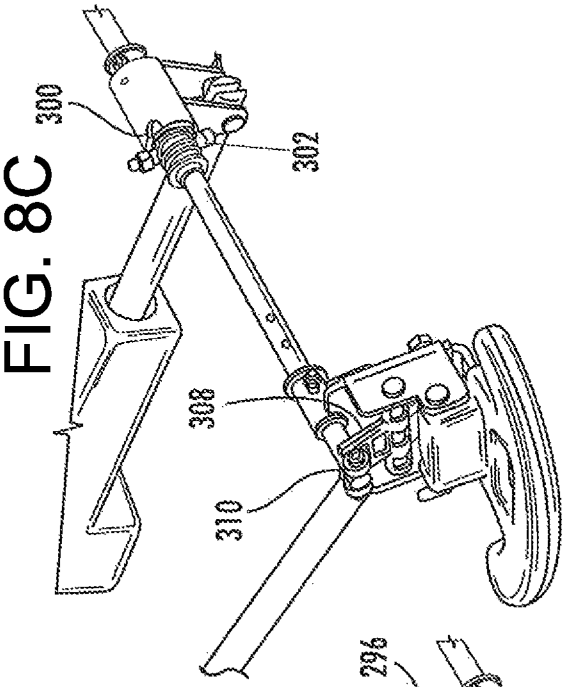
FIG. 8C is a right perspective view of the braking system of FIG. 5C in override mode wherein the central levering mechanism is in a brake position and wherein the central levering mechanism is in a steer position.
Figure 8B:
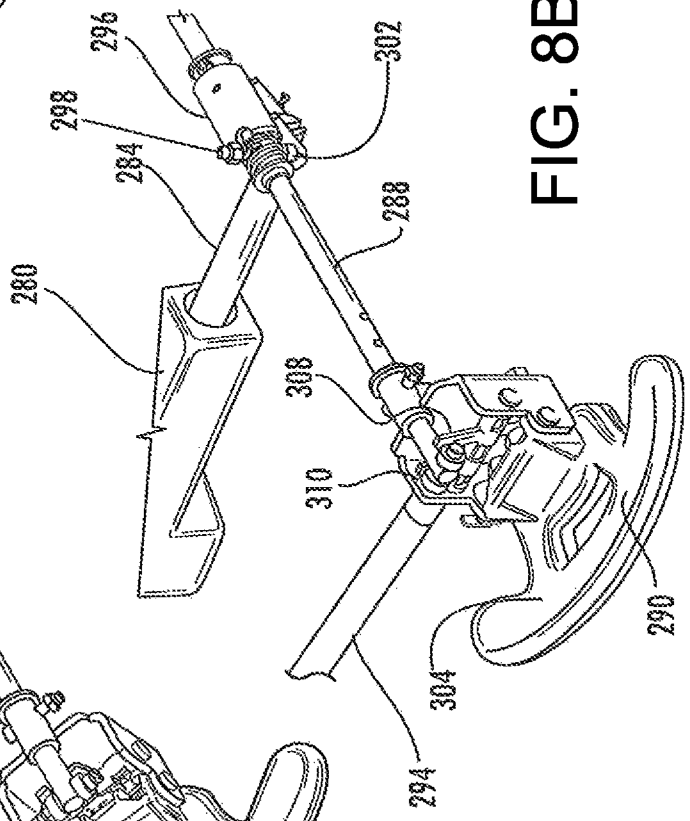
FIG. 8B is a right perspective view of the braking system of FIG. 5C in override mode wherein the central levering mechanism is in a brake position and wherein the central levering mechanism is in a brake position and wherein an override pedal is in a neutral position.
Figure 8A:
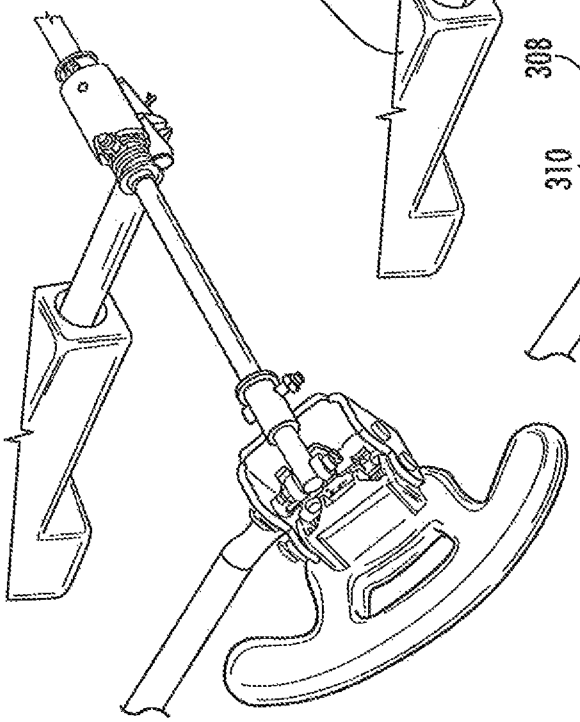
FIG. 8A is a right perspective view of the braking system of FIG. 5C in override mode wherein the central levering mechanism is in a brake position and wherein the central levering mechanism is in a brake position and wherein an override pedal is in a brake position.

In one embodiment, the pedal 290 can then be used to manually override the braking system 206 using foot or hand actuation. In FIGS. 6A-6C, the actuator 280 coupling to the shaft 288 is released when in the steer position and remains in this position while the pedal 290 is moved from a brake position (FIG. 6A), through a neutral position (FIG. 6B), to a steer position (FIG. 6C). In FIGS. 7A-7C, the actuator 280 coupling to the shaft 288 is released when in the neutral position and remains in this position while the pedal 290 is moved from a brake position (FIG. 7A), through a neutral position (FIG. 7B), to a steer position (FIG. 7C). In FIGS. 8A-8C, the actuator 280 coupling to the shaft 288 is released when in the brake position and remains in this position while the pedal 290 is moved from a brake position (FIG. 8A), through a neutral position (FIG. 8B), to a steer position (Figure C).

As stated above, in the illustrated embodiment, when the pedal 290 is released, the pin 298 is again urged toward the sleeve member 296 such that as the sleeve 296 is rotated about the shaft 288 by activation of the actuator 280, the pin 298 eventually re-engages the notch 300 therein, thereby re-coupling the actuator 280 to the shaft 288 and caster braking mechanisms 292. Alternatively, the shaft 288 and pin 298 can be rotated manually using the stowed pedal 290 until the notch 300 is re-engaged by the pin 298.

Figure 9:
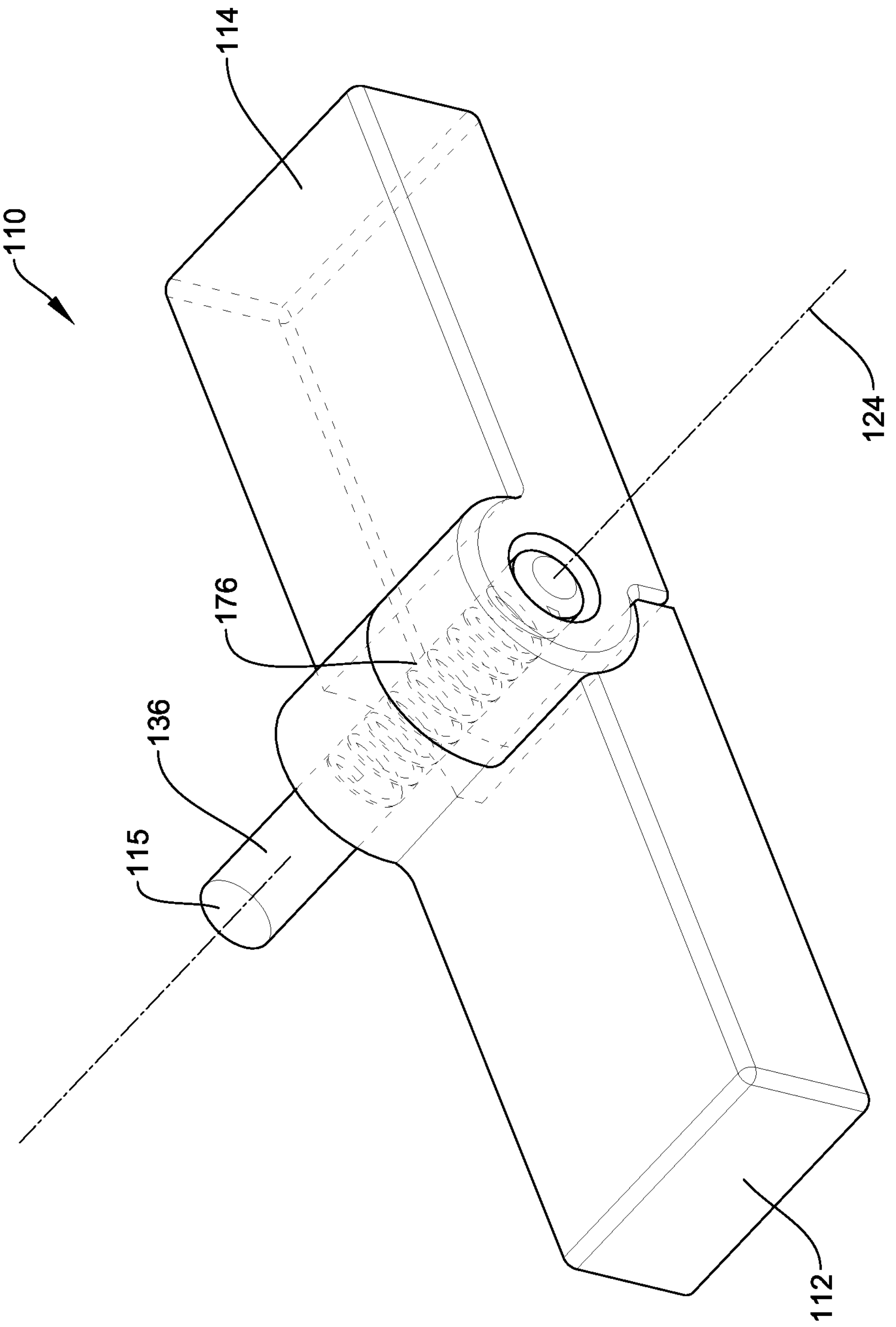
FIG. 9 is a partial perspective view of a pedal assembly in accordance with another embodiment of the instant disclosure.
Figure 10A:
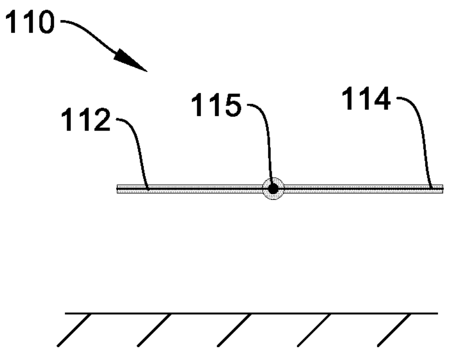
FIG. 10A is a schematic view of the pedal assembly of FIG. 9 in one configuration and orientation corresponding to one state.
Figure 11A:
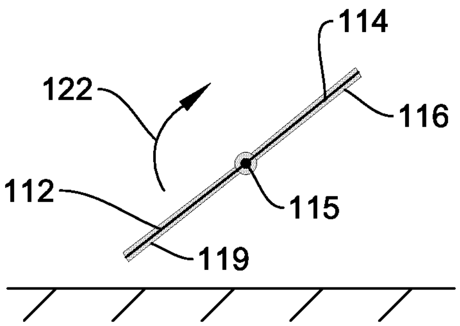
FIG. 11A is a schematic view of the pedal assembly of FIG. 9 in another configuration and orientation corresponding to another state.
Figure 12A:
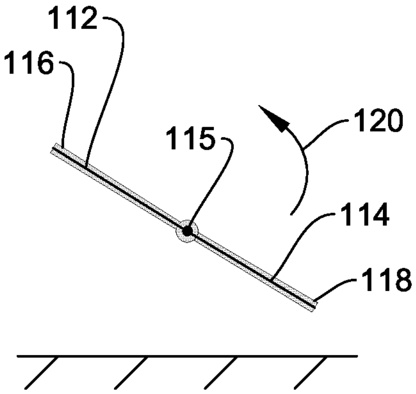
FIG. 12A is a schematic view of the pedal assembly of FIG. 9 in third configuration and orientation corresponding to a third state.

FIG. 9 is a partial perspective view of a pedal assembly 110 in accordance with another embodiment of the instant disclosure. In one embodiment, a support structure of the apparatus 100 (such as the frame system described above) includes a base (e.g., base frame 200), a patient support surface (e.g., deck support 700), and at least one wheel 202 to facilitate movement of the apparatus 100. The pedal assembly 110 can be used with the braking system 206 described above in place of the pedal 290 shown in FIGS. 4A-4C. The pedal assembly 110 is coupled to the support structure for selecting between states associated with the patient support apparatus 100. In one embodiment, the apparatus 100 further includes a lock mechanism (e.g., braking mechanism 292 described above) operably coupled between the pedal assembly 110 and at least one wheel 202 of the apparatus 100, and each of the states is a state of the wheel(s) 202 with the lock mechanism being configured to effectuate transition between the states based on movement of the pedals 112, 114 of the pedal assembly 110. FIGS. 10A, 11A, and 12A are schematic views of the pedal assembly 110 of FIG. 9 in three different configurations and orientations corresponding to three different states: e.g., neutral (FIG. 10A), steer (FIG. 11A), and brake (FIG. 12A). Although in the illustrated embodiment, the pedal assembly 110 is used to select among three states, the pedal assembly 110 may be used to select among any number of states (e.g., two or more than three). Furthermore, in other embodiments, the pedal assembly 110 is used to select states related to other aspects of the patient support apparatus 100 other than (or in addition to) mobility of the apparatus 100.

In the illustrated embodiment, the pedal assembly 110 includes two pedals 112, 114 and a pedal support 115 coupled to the pedals 112, 114 for supporting the pedals 112, 114. The pedals 112, 114 may be adjacent to one another such that movement of one effects movement of the other under certain conditions, similar to movement of a seesaw. In the illustrated embodiment, each pedal 112, 114 is configured to move between respective upper and lower positions, each position for each pedal corresponding to a different state. In the illustrated embodiment, the pedal 112 is configured to move to a fully-depressed position (FIG. 11A) corresponding to one state (e.g., steer), and the pedal 114 is configured to move to its fully-depressed position (FIG. 12A) corresponding to another state (e.g., brake). In FIG. 10A, neither pedal 112, 114 is in its respective fully-depressed position. In the illustrated embodiments, the fully-depressed positions correspond to the “lower” positions. The upper position can be the uppermost position or another position that is spatially disposed in an upwards direction from the lower position, and the lower position can be the lowermost position or another position that is spatially disposed in a downward direction from the upper position.

In other embodiments, the pedal assembly 110 has one or more than two pedals. With reference to FIG. 11A, in one embodiment, movement of the pedal (e.g., pedal 114) when in the first state from a first position 116 (e.g., upper) to a second position 118 (e.g., lower) different from the first position 116 causes transition from the first state to the second state (the first state corresponding to the first position 116), and movement of the same pedal (e.g., pedal 114) when in the second state from the second position to the first position results from transition from the second state to the first state (the second state corresponding to the second position). The pedal 114 in such an embodiment may be operably coupled to another input mechanism such that activation and/or movement of the other such input mechanism causes movement of the pedal 114 away from its respective depressed position (e.g., position 118).

In embodiments with more than one pedal in the pedal assembly 110, the pedals 112, 114 may be operably coupled to one another such that the pedal 112 moving to one of its depressed positions (e.g., depressed position 119 shown in FIG. 11A) causes the pedal 114 to move away from its respective depressed position 118 (FIG. 12A) in a direction 120, and the pedal 114 moving to one of its respective depressed positions (e.g., depressed position 118 shown in FIG. 12A) causes the pedal 112 to move away from its respective depressed position (e.g., depressed position 119 shown in FIG. 11A) in a direction 122 that is opposite the direction 120. Although the directions 120, 122 are rotational directions in the illustrated embodiment, the directions 120, 122 can be non-rotational directions, such as linear.

In the illustrated embodiment, the pedals 112, 114 are configured to pivot together in a rotational direction (e.g., direction 122 shown in FIG. 11A) relative to a respective pivot axis 124 (FIG. 9) to transition from a first state to a second state, and the pedals 112, 114 are configured to pivot together in an opposite rotational direction (e.g., direction 120 shown in FIG. 12A) relative to the respective pivot axis 124 to transition from the second state to the first state. The pedals 112, 114 “pivoting together” means pivoting simultaneously for at least a portion of the transition between states. The pivot axis 124 may extend generally along the pedal support 115. Although in the illustrated embodiment the pivot axis is the same pivot axis for both pedals 112, 114 (the respective pivot axes are coaxial with one another such that the pedals 112, 114 are pivotable relative to the same axis 124), in other embodiments the pivot axes are offset and parallel to one another. In another embodiment, the pivot axes are offset and not parallel to one another. Furthermore, although the pedals 112, 114 in the illustrated embodiment are generally coupled to another with the pedal support 115 such that the pedal assembly 110 operates similarly to a seesaw, the pedals 112, 114 can be configured for other movement, which may not be pivotal or rotational. For example, the pedals 112, 114 may be configured for linear movement.

Figure 10B:
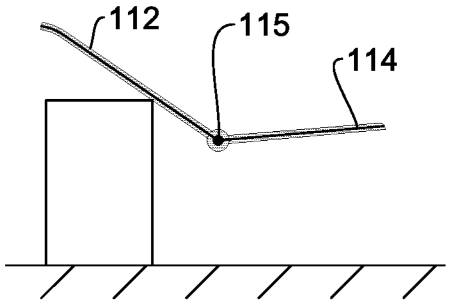
FIG. 10B is a schematic view of the pedal assembly corresponding to FIG. 10A with obstructions preventing the applicable pedal from being disposed in its intended position.
Figure 11B:
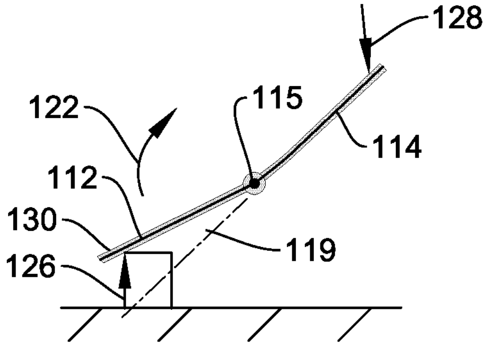
FIG. 11B is a schematic view of the pedal assembly corresponding to FIG. 11A with obstructions preventing the applicable pedal from being disposed in its intended position.
Figure 12B:
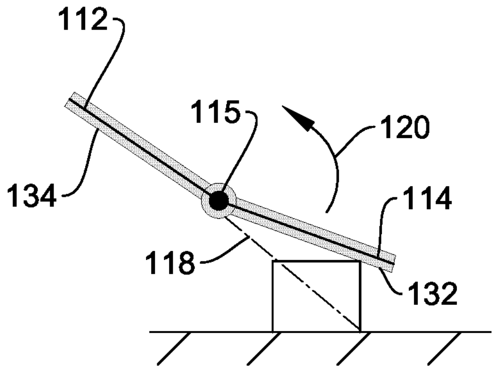
FIG. 12B is a schematic view of the pedal assembly corresponding to FIG. 12A with obstructions preventing the applicable pedal from being disposed in its intended position.

FIGS. 10B, 11B, and 12B are schematic views of the pedal assembly 110 corresponding to FIGS. 10A, 11A, and 12A, respectively, with obstructions preventing the applicable pedal (112 and/or 114) from being disposed in its intended position. The obstruction can be any object, such as a caregiver’s foot, that is disposed in an intended path of travel of the pedal (112 and/or 114) upon moving (or attempting to move) to a different position, such as a depressed position. The apparatus 100 may have more than one pedal assemblies 110 that are operably coupled to one another such that movement of an “active” pedal assembly (a pedal assembly with which the caregiver is activating directly) causes a corresponding movement of a “passive” pedal assembly (a pedal assembly with which the caregiver is not activating directly). In such an embodiment, the “passive” pedal assembly may encounter an obstruction upon movement to an intended position (due to movement of the active pedal assembly), especially since the passive assembly may be disposed in another area of the apparatus 100 that is not within the field of view of the caregiver while he/she is activating the active pedal assembly. The force of the obstruction on the pedal (112 and/or 114) is in a direction different from the direction of the force applied to the pedal to change the state. In the illustrated embodiment and with reference to FIG. 11B, such force 126 is in a direction that is opposite the direction of the force 128 applied to the pedal to change the state.

As illustrated, each of the pedals 112, 114 is configured to move independently of the other in a direction away from a depressed position when in its respective depressed position. Such independent movement allows the unobstructed pedal to remain in its intended position regardless of the obstruction being encountered by the other pedal. In the illustrated embodiment, and with reference to FIG. 11B, the pedal 112 is configured to move independently of the pedal 114 in a direction 122 away from a depressed position (e.g., position 119) when in the state corresponding to that depressed position, and with reference to FIG. 12B, the pedal 114 is configured to move independently of the pedal 112 in a direction 120 away from a depressed position (e.g., position 118) when in the state corresponding to that depressed position. In the illustrated embodiment, at least a distal portion 130 of the pedal 112 (disposed opposite the pedal support 115) is configured to pivot (relative to its pivot axis 124) independently from the pedal 114 in the direction 122 when in a first state, and at least a distal portion 132 of the pedal 114 (disposed opposite the pedal support 115) is configured to pivot (relative to its pivot axis 124) independently of the pedal 112 in the direction 120 when in the second state.

In the illustrated embodiment, the directions 120, 122 are opposite directions of one another. However, in other embodiments, the directions 120, 122 can be directions other than opposite directions of one another. Furthermore, although the directions 120, 122 are rotational directions, clockwise and counterclockwise, in the illustrated embodiment, the directions may be linear directions, such as up and down, in other embodiments. Such independent movement (for each of the pedals if more than one pedal in the assembly 110) may be in a “breakaway” direction that is different from the direction of movement upon moving to a depressed position, which is a position in which the pedal moves upon being depressed. Furthermore, with reference to FIG. 11B, at least the distal portion 130 of the pedal (e.g., pedal 112) may be moveable from a position 119 toward another position 134 (FIG. 12B) upon application of a force 126 on the pedal 112 directed toward the position 134 without the force causing transition from one state to another state. The application of force 126 results from contact of the pedal 112 with an obstruction that is external of the pedal assembly 110.

Although in the illustrated embodiment, each of the pedals 112, 114 are moveable upon contacting an obstruction without causing an unintentional change in state (e.g., of the locking assembly), other portion(s) of the pedal assembly 110 may be moveable in the same way. In such embodiments, a "breakaway" portion of the pedal assembly 110 is moveable away from an operating configuration (such as those shown in FIGS. 10A, 11A, and 12A) upon application of a force (e.g., force 126 shown in FIG. 11B) on a distal portion (e.g., distal portions 130, 132) of the pedal assembly 110 without the force causing transition between states, but which causes the pedals to assume another configuration (see FIGS. 10B, 11B, and 12B). The "breakaway" portion can be the pedal support 115 (or portion thereof) of the pedal assembly 110. For example, a distal portion 136 (FIG. 9) of the pedal support 115 (proximate the pedals 112, 114) can be moveable relative to a proximal portion of the pedal support such that the distal portion 136 of the pedal support 115 moves with the pedals 112, 114 relative to the proximal portion of the pedal support 115 upon contacting an obstruction (the obstruction contact causing movement of the pedal assembly). The operating configuration can be the position in which the breakaway portion (e.g., pedal support and/or pedals) is disposed with no such contact with an obstruction.

Figure 13:
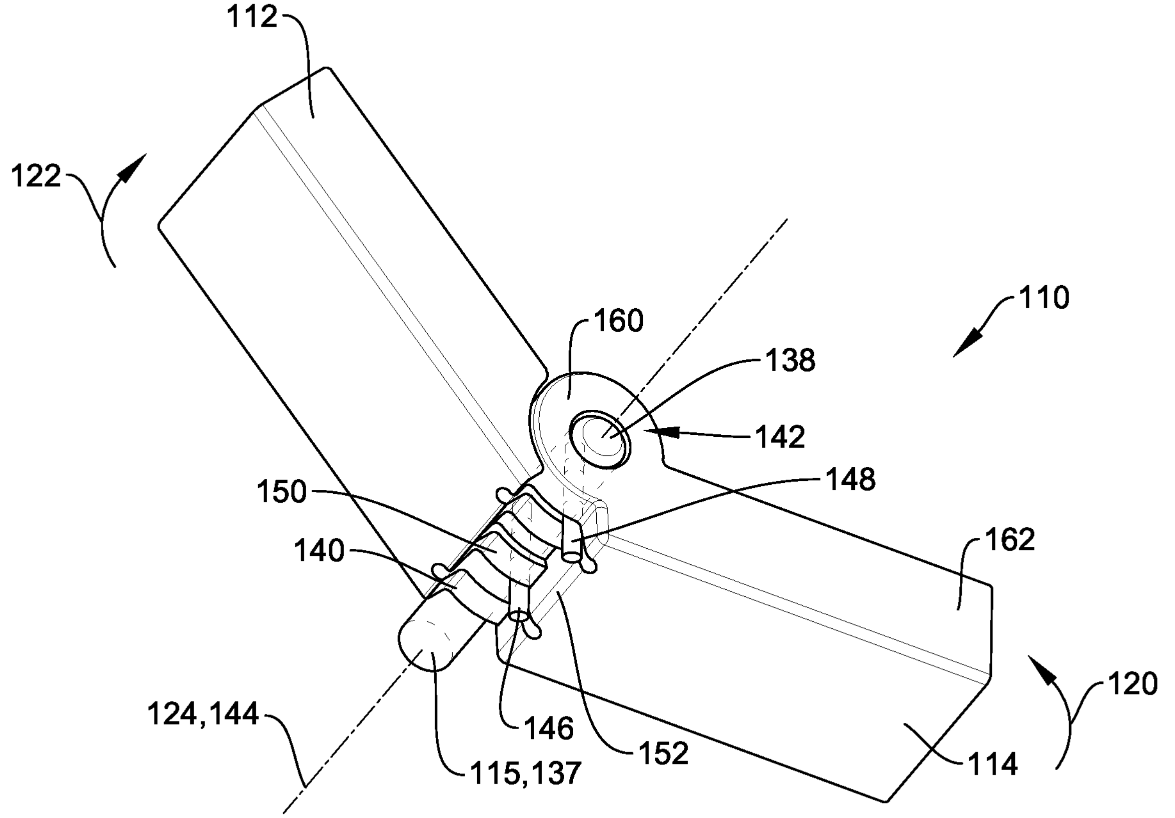
FIG. 13 is a partial bottom perspective view of the pedal assembly of FIG. 9 in the configuration and orientation depicted in FIG. 12B.

FIG. 13 is a partial bottom perspective view of the pedal assembly 110 of FIG. 9 in the configuration depicted in FIG. 12B. In the illustrated embodiment, the pedal support 115 is configured to support and facilitate movement of the pedals 112, 114 for actuation of the lock mechanism. In some embodiments, the pedal support 115 may be the transversal shaft 288 or actuator bar 294 described above. As shown in FIG. 13, the pedal support 115 may include a cylindrical shaft 137 with a distal end 138 extending through proximal ends 140, 142 of the pedals 112, 114, respectively, with the pivot axis 124 being coaxial with a longitudinal axis 144 of the shaft 137. A proximal end of the shaft 137 may engage with the lock mechanism as described above. The shaft 137 may be rotatably coupled to each of the pedals 112, 114 at the proximal ends 140, 142. Although the shaft 137 is illustrated as being one continuous shaft with each of the pedals 112, 114 being supported by and pivotable relative to the shaft 137, in other embodiments the shaft 137 may be more than one piece and/or shaft.

To restrict movement of each of the pedals 112, 114 relative to the pedal support 115 such that under certain conditions the pedal support 115 moves with the pedals 112, 114, the pedal support 115 further includes protrusions 146, 148 protruding radially outwardly from an outer surface of the shaft 137 and between abutment surfaces 150, 152 of the pedals 112, 114. Each of the protrusions 146, 148 is fixedly coupled to the shaft 137 such that the protrusions 146, 148 move with the shaft 137 as it rotates. This configuration allows free movement of each of the pedals 112, 114 in the "breakaway" direction (direction 122 for pedal 112, and direction 120 for pedal 114) without causing rotation of the pedal support 115, whereby rotation of the pedal support 115 effects transition to a different state. In one embodiment, at least a portion of the pedal support 115 rotates to effect transition between states. In one embodiment, at least a portion of the pedal support 115 moves or rotates to transition between states. In the illustrated embodiment, the pedal 112 is configured to pivot independently from the pedal 114 in the direction 122 when in a first state (e.g., corresponding to FIGS. 11A-11B) without causing rotation of the shaft 137, and the pedal 114 is configured to pivot independently from the pedal 112 in the direction 120 when in a second state different from the first state (e.g., the second state corresponding to FIGS. 12A-12B) without causing rotation of the shaft 137. Furthermore, in the illustrated embodiment and with reference to the depressed positions of FIGS. 11A-12B described above, the pedal 112 is configured to move independently from the pedal 114 away from a depressed position (e.g., position 119 in FIG. 11A) without causing movement of the pedal support 115, and the pedal 114 is configured to move independently from the pedal 112 away from a depressed position (e.g., position 118 in FIG. 12A) without causing movement of the pedal support 115. The protrusions 146, 148 can be radially aligned relative to the shaft 137. In other embodiments, the protrusions 146, 148 may be radially offset from one another. Furthermore, although the protrusions 146, 148 are depicted as being generally cylindrical in shape, the protrusions 146, 148 can take on other shapes, such as having a semi-cylindrical cross-section. The protrusions 146, 148 are appropriately spaced apart from one another in the axial direction (relative to the axis 144) to accommodate spacing of the pedal collars, described in more detail below. Although the illustrated embodiment includes two protrusions 146, 148, the pedal assembly 110 may include less or more protrusions or none. For example, each of the pedals 112, 114 may be coupled to the pedal support 115 through a one-way bearing such that each of the pedals 112, 114 is able to move relative to the shaft 137 in only one direction (the breakaway direction).

In another embodiment, the shaft 137 or pedal support 115 does not rotate to effect transition to another state. In such an embodiment, the movement of the pedal may be sensed, and actuation of the lock mechanism is accomplished via electrical signals. For example, the movement of the pedal to a depressed position (indicating an intent to transition to another state) is sensed by a sensor of the pedal assembly, whereby the movement sensed by the sensor is sent as a signal to the control system or lock mechanism itself. The received signal then prompts transition to the intended state.

Figure 14:
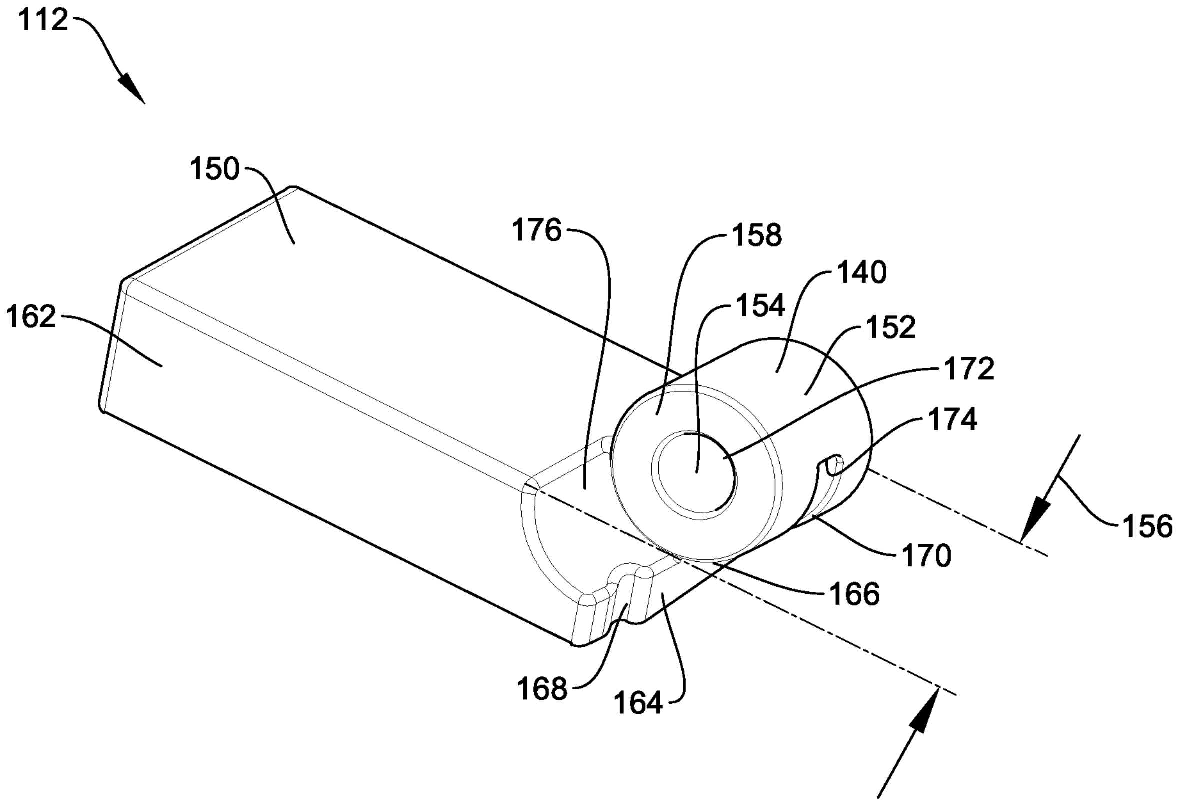
FIG. 14 is a perspective view of a pedal of the pedal assembly of FIG. 9.

FIG. 14 is a perspective view of the pedal 112 of the pedal assembly 110 of FIG. 9. The following description of the pedal 112 also applies to the pedal 114 as they are identical in size and shape. Although the pedals 112, 114 are identical to one another in the illustrated embodiment, the pedals may be dissimilar in size and/or shape in other embodiments. In the illustrated embodiment, the pedal 112 has a lever portion 150 and a collar 152 extending from the lever portion 150 at the proximal end 140 of the pedal 112 to be coupled to the pedal support 115. The collar 152 can be generally cylindrical in shape with an aperture 154 extending therethrough for receiving the pedal support 115. In the illustrated embodiment, the collar 152 extends to a midpoint of a width 156 of the pedal 112 such that when assembled, the inner surfaces 158 of the collars 152 contact one another. Furthermore, in the illustrated embodiment (and as best seen in FIG. 13 on pedal 114), the outer face 160 of the collar 152 is planar with the side 162 of the pedal 112.

With reference to FIG. 14, in one embodiment, at least one of the pedals 112, 114 has an abutment surface 164 at its respective proximal end 140 for abutting the protrusion 146 (FIG. 13) of the pedal support 115 to effect rotation of the pedal support 115. The abutment surface 164 of the pedal 112 extends away from the collar 152 to a distance to accommodate a length of the protrusion 146. In the illustrated embodiment, the abutment surface 164 defines grooves 166, 168 for receiving the protrusions 146, 148. In the illustrated embodiment, the abutment surface 164 abuts the protrusions 146, 148 when biased thereto (described in more detail below). In embodiments with only one protrusion, the abutment surfaces 164 of the pedals 112, 114 abut one protrusion when biased thereto. In embodiments with no protrusions, the abutment surfaces 164 of the pedals 112, 114 may abut one another (instead of or in addition to the protrusions) and act as a hard stop for the other pedal in the corresponding direction.

Furthermore, in another embodiment, the pedals 112, 114 may not have such abutment surfaces. In such an embodiment, the bottommost point of the collar 152 may be planar with a bottom surface of the pedal 112. Referring to FIG. 14, the collar 152 defines a cavity 170 adjacent the aperture 154 for defining a path of travel of the protrusion 146 of the pedal support 115 relative to the pedal 112 with ends 172, 174 defining the cavity 170 acting as stops for the path of travel. In the illustrated embodiment, the end 172 defining the cavity 170 aligns with the groove 166 to accommodate the protrusion 146 as it extends through the cavity 170 and along the groove 166 (when the pedal 112 is biased as such). Referring to FIG. 9, the pedal 112 may be pivotably biased in one direction (e.g., direction 120 shown in FIG. 13) by a biasing member 176, such as a spring, wherein the pedal support 115 extends through the biasing member 176 and each end of the biasing member 176 is fixedly coupled to one of the pedals 112, 114. The pedal 114 may be pivotably biased in another direction (e.g., direction 122 shown in FIG. 13) by its own biasing member, such as a spring. In the illustrated embodiment, when the pedal 112 is fully biased to the operating configuration, the protrusion 146 is disposed at one end 172 within the cavity 170. The cavity 170 allows the pedal 112 to move relative to the pedal support 115 in the breakaway direction (direction 120 for pedal 112 in the illustrated embodiment). Although the cavity 170 is illustrated as being a thru-hole (extending from the inner surface to the outer surface of the collar 152), in other embodiments the cavity 170 may be a groove formed in the inner surface of the collar 152.

The pedal 112 defines a collar groove 176 for receiving the collar 152 of the other pedal 114. The collar groove 176 is located at the proximal end 140 of the pedal 112 and extends from the collar 152 to the side 162 of the pedal 112. Although the collars 152 and collar grooves 176 of the pedals 112, 114 have the same width in the illustrated embodiment (because the pedals 112, 114 are identical in size and shape), the collars and their corresponding collar grooves may be dissimilar in size and/or shape in other embodiments. The groove 168 extends from the collar groove 176 to the bottom surface of the pedal 112 in the illustrated embodiment to accommodate the length of the protrusion 148 (FIG. 13). The groove 170 extends from the aperture 154 of the collar 152 to the bottom surface of the pedal 112. Still referring to FIGS. 13 and 14, the lever portion 150 of the pedal 112 is generally rectangular in shape. The lever portion 150 can take on a variety of other shapes and/or sizes in other embodiments.

In the illustrated embodiment and with reference to FIG. 9, when the pedal assembly 110 is in the operating configuration (i.e., free from obstructions), the bottom surfaces of the pedals 112, 114 together define a unitary surface extending between distal ends of the pedals 112, 114 (excluding any gap between proximal ends 140 of the pedals 112, 114). Although such unitary surface is illustrated as being generally flat and planar, the unitary surface may be arcuate or have other non-planar contouring.

The words used in the specification are words of description rather than limitation, and it is understood that various changes may be made without departing from the spirit and scope of the disclosure. As previously described, the features of various embodiments that may not be explicitly described or illustrated. While various embodiments could have been described as providing advantages or being preferred over other embodiments or prior art implementations with respect to one or more desired characteristics, one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

We claim:

1. A patient support apparatus comprising:

a patient support structure comprising a base having a plurality of wheels to facilitate movement of said patient support apparatus, two wheels of said plurality of wheels being spaced apart along said base along a base axis; and a pedal assembly being coupled to said patient support structure and having a pivotal range of motion about an axis of rotation perpendicular to said base axis to select between a braking state and a non-braking state for at least said two wheels, said pedal assembly having first and second pedals and a pedal support, said first and second pedals coupled to said pedal support on opposed sides of said pedal support and on opposed sides of said axis of rotation, said first and second pedals each being configured to pivot independently of said other pedal when encountering an obstruction while remaining coupled to said pedal support wherein said first and second pedals pivot in unison with said pedal support over said pivotal range of motion when a force is applied to one of said first and second pedals and no obstruction is encountered, and one pedal of said first and second pedals pivots independently of another pedal of said first and second pedals when a force is applied to one of said first and second pedals and when said one pedal encounters an obstruction while remaining coupled to said pedal support.

2. The patient support apparatus according to claim 1, wherein said first and second pedals are each pivotally mounted relative to said pedal support about first and second pivot axes, respectively, and wherein said first and second pivot axes of said first and second pedals are coaxial with each other.

3. The patient support apparatus according to claim 1, wherein said pedal support comprises a shaft, said shaft having a rotational axis coaxial with said axis of rotation of said pedal assembly.

4. The patient support apparatus according to claim 3, wherein said first and second pedals are each pivotally mounted relative to said pedal support about first and second pivot axes, respectively, and wherein said first and second pivot axes of said first and second pedals are coaxial with said rotational axis and said axis of rotation of said pedal assembly.

5. The patient support apparatus of claim 2, wherein said first pedal and said second pedal lie in a common plane when in a first configuration and when neither said first pedal and said second pedal encounters an obstruction.

6. The patient support apparatus of claim 5, wherein said first configuration corresponds to said non-braking state of said at least two wheels when in a first orientation.

7. The patient support apparatus of claim 6, wherein said first configuration corresponds said braking state of said at least two wheels when in a second orientation.

8. The patient support apparatus of claim 7, wherein said first configuration corresponds to a steering state of said at least two wheels when in a third orientation.

9. The patient support apparatus of claim 5, wherein said first pedal is biased toward said first configuration.

10. The patient support apparatus of claim 9, wherein said second pedal is biased toward said first configuration.

11. A patient support apparatus comprising:

a support structure including a base, a patient support surface, and a plurality of wheels to facilitate movement of the patient support apparatus, said base having two opposed sides;

a pedal assembly coupled to said support structure adjacent one side of said opposed sides of said base to select between a braking state, a steering state, and an unbraking state of said plurality of wheels, said pedal assembly comprising first and second pedals being configured to rotate in unison together in first configuration to a first orientation corresponding to said braking state, to a second orientation corresponding to said unbraking state, and to a third orientation corresponding to said steering state; and a pedal support, said first and second pedals mounted to said pedal support and being operably coupled with one another about an axis of rotation perpendicular to said one side and each of said first and second pedals being configured to move about said axis of rotation independently of the other while remaining mounted to said pedal support when encountering an obstruction to form a second configuration.

12. The patient support apparatus of claim 11, wherein said axis of rotation extends through said pedal support.

13. The patient support apparatus of claim 12, wherein said pedal support is a shaft extending said first and second pedals.

14. The patient support apparatus of claim 13, wherein said pedal support includes a spring, said spring biasing said first and second pedals into said first configuration.

15. The patient support apparatus of claim 14, wherein said spring extends around said shaft.

16. The patient support apparatus of claim 15, wherein said spring forms a pair of protrusions extending radially outwardly from said shaft.

17. The patient support apparatus of claim 16, wherein each of said first and second pedals has an abutment surface that contact one another when in said first configuration.

18. The patient support apparatus of claim 17, wherein said protrusions of said spring bear against at least one abutment surface of one of said first and second pedals.

19. The patient support apparatus of claim 18, wherein said at least one abutment surface includes grooves for receiving said protrusions.

20. The patient support apparatus of claim 19, wherein each abutment surface of said abutment surfaces includes grooves for receiving said protrusions.

* * * * *